United States Patent
Takahashi et al.

(10) Patent No.: US 10,482,341 B2
(45) Date of Patent: Nov. 19, 2019

(54) OBJECT RECOGNITION DEVICE AND OBJECT RECOGNITION METHOD

(71) Applicant: FANUC CORPORATION, Yamanashi (JP)

(72) Inventors: Yuuki Takahashi, Yamanashi (JP); Atsushi Watanabe, Yamanashi (JP); Minoru Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/704,083

(22) Filed: Sep. 14, 2017

(65) Prior Publication Data

US 2018/0089524 A1   Mar. 29, 2018

(30) Foreign Application Priority Data

Sep. 29, 2016   (JP) .................... 2016-191125

(51) Int. Cl.
| | |
|---|---|
| *G06K 9/00* | (2006.01) |
| *G06K 9/32* | (2006.01) |
| *G06T 7/73* | (2017.01) |
| *G06T 7/00* | (2017.01) |
| *G06K 9/46* | (2006.01) |

(Continued)

(52) U.S. Cl.
CPC ......... *G06K 9/3241* (2013.01); *G06K 9/2063* (2013.01); *G06K 9/42* (2013.01); *G06K 9/46* (2013.01); *G06K 9/6202* (2013.01); *G06T 7/74* (2017.01); *G06T 7/97* (2017.01); *G06K 2209/40* (2013.01); *G06T 2200/04* (2013.01);

(Continued)

(58) Field of Classification Search
CPC .................................................. G06K 9/3241
See application file for complete search history.

(56) References Cited

U.S. PATENT DOCUMENTS

| | | | | |
|---|---|---|---|---|
| 2010/0004778 A1* | 1/2010 | Arimatsu | ............... | B25J 9/1697 700/214 |
| 2013/0114861 A1 | 5/2013 | Takizawa | | |

FOREIGN PATENT DOCUMENTS

| | | |
|---|---|---|
| JP | H10-021407 A | 1/1998 |
| JP | H10-031742 A | 2/1998 |

(Continued)

OTHER PUBLICATIONS

Office Action dated Oct. 23, 2018 in corresponding Japanese Application No. 2016-191125; 7 pages including English-language translation.

(Continued)

*Primary Examiner* — Stephen P Coleman
(74) *Attorney, Agent, or Firm* — Maier & Maier, PLLC

(57) ABSTRACT

The object recognition device includes an imaging unit that captures images of a predetermined monitoring area to acquire a three-dimensional image and a two-dimensional image, an object extraction unit that extracts an area having pixels whose pixel values are within a predetermined range from the three-dimensional image acquired by the imaging unit, an image searching unit that searches the two-dimensional image, acquired by the imaging unit, for a reference image registered in advance according to the type of an object, and a determination unit that determines the type of the object depending on whether or not the reference image searched for by the image searching unit exists in the area extracted by the object extraction unit.

6 Claims, 8 Drawing Sheets

(51) Int. Cl.
*G06K 9/62* (2006.01)
*G06K 9/20* (2006.01)
*G06K 9/42* (2006.01)

(52) U.S. Cl.
CPC ............... *G06T 2207/10024* (2013.01); *G06T 2207/10028* (2013.01); *G06T 2207/30204* (2013.01)

(56) References Cited

FOREIGN PATENT DOCUMENTS

| | | | |
|---|---|---|---|
| JP | 2004-180036 A | 6/2004 | |
| JP | 2006-003994 A | 1/2006 | |
| JP | 2008-040616 A | 2/2008 | |
| JP | 2013-101045 A | 5/2013 | |
| JP | 2014-238687 A | 12/2014 | |
| JP | 5891399 B | 3/2016 | |
| WO | 2009/008864 A1 | 1/2009 | |
| WO | WO-2012061945 A1 * | 5/2012 | ....... G06F 17/30247 |

OTHER PUBLICATIONS

Search Report dated Oct. 5, 2018 in corresponding Japanese Application No. 2016-191125; 33 pages including English-language translation.
S. Murakami et al., "Robot Vision System with Gray-Scale Image and Range Image for the Outdoor Electricity Distribution Work", The Transactions of the Institute of Electrical Engineers of Japan, vol. 122-C, No. 11, pp. 1961-1968.
N. Shimomura et al., "A Method of Tracking a Forward Vehicle using a Scanning Laser Radar and a Camera", The Transactions of the Institute of Electrical Engineers of Japan, vol. 123-C, No. 8, pp. 1427-1438.
Y. Gao et al., "Fast face identification under varying pose from a single 2-D model view", IEE Proceedings-Vision, Image and Signal Processing, US, IET, vol. 148, No. 4, pp. 248-253.
Office Action dated Apr. 16, 2019 in corresponding Japanese Application No. 2016-191125; 7 pages.

* cited by examiner

OBJECT RECOGNITION DEVICE AND OBJECT RECOGNITION METHOD

CROSS-REFERENCE TO RELATED APPLICATIONS

This application is based on and claims priority to Japanese Patent Application No. 2016-191125 filed on Sep. 29, 2016, the entire content of which is incorporated herein by reference.

TECHNICAL FIELD

The present invention relates to an object recognition device and an object recognition method.

BACKGROUND

Conventionally, a technology of identifying the position of a three-dimensional object by combining a range sensor for acquiring three-dimensional information of the object and a camera for acquiring a two-dimensional image thereof has been known (see PTL 1, for example).

In the technology of PTL 1, a two-dimensional image acquired by a camera is processed to detect an image of an object in the two-dimensional image and acquire two-dimensional positional information of the object, and based on the acquired two-dimensional positional information, the three-dimensional position and the posture of the object are calculated from three-dimensional information.

CITATION LIST

Patent Literature

{PTL 1}
Japanese Unexamined Patent Application, Publication No. 2013-101045

SUMMARY OF INVENTION

An aspect of the present invention provides an object recognition device including an imaging unit that captures images of a predetermined monitoring area to acquire a three-dimensional image and a two-dimensional image; and a controller, wherein the controller is configured to conduct: an object extraction process that extracts an area having pixels whose pixel values are within a predetermined range from the three-dimensional image acquired by the imaging unit; an image searching process that searches the two-dimensional image, acquired by the imaging unit, for a reference image registered in advance according to a type of an object; and a determination process that determines the type of the object depending on whether or not the reference image searched for in the image searching process exists in the area extracted in the object extraction process.

DESCRIPTION OF EMBODIMENTS

An object recognition device 1 and an object recognition method according to an embodiment of the present invention will be described below with reference to the drawings.

Figure 1:
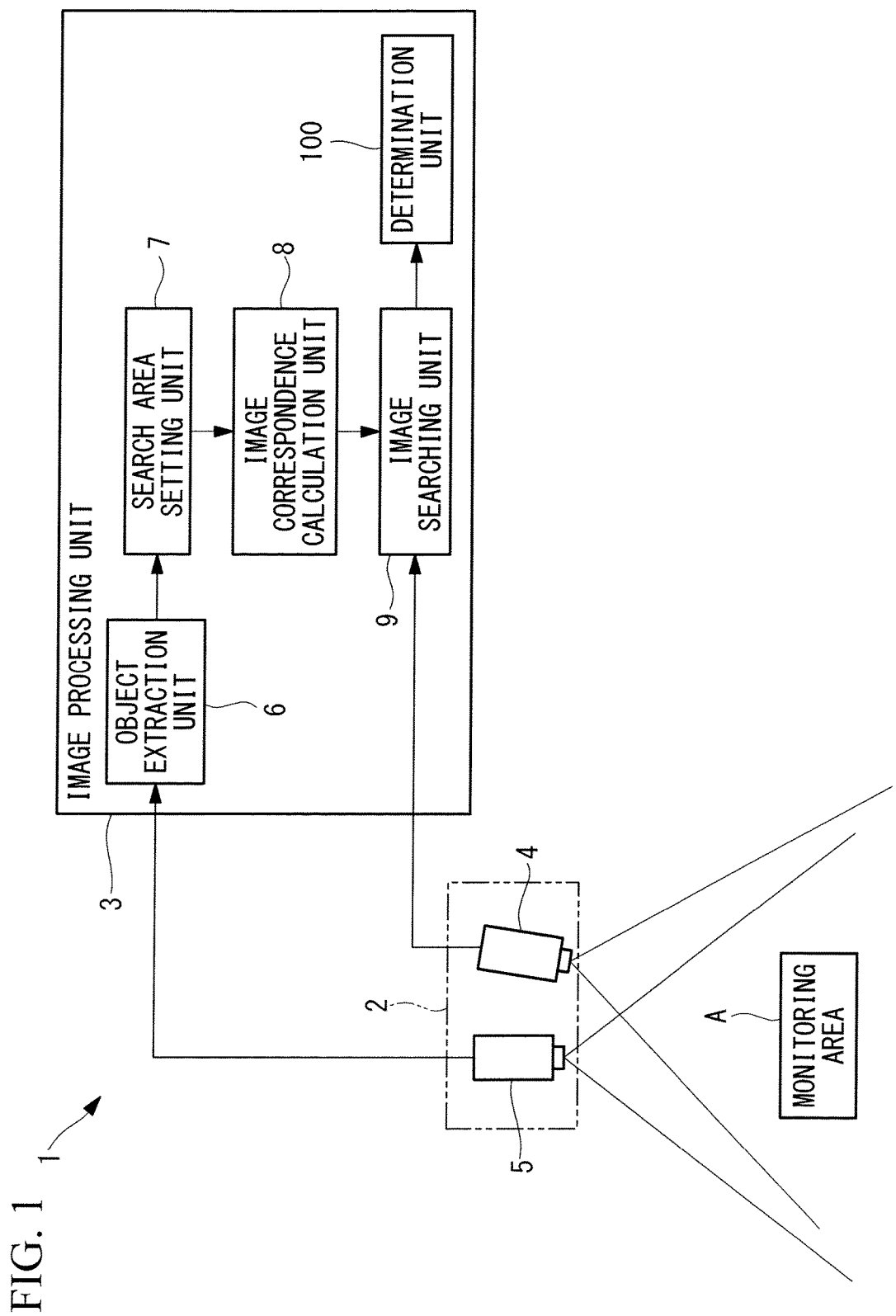
FIG. 1 is an overall block diagram illustrating an object recognition device according to an embodiment of the present invention.

The object recognition device 1 according to the present embodiment includes an imaging unit 2 that captures an image of a predetermined monitoring area A, and an image processing unit 3 that recognizes the type of an object based on a two-dimensional image G2 and a three-dimensional image G1 acquired by the imaging unit 2, as illustrated in FIG. 1.

The imaging unit 2 includes a two-dimensional camera 4 for capturing an image of an area including the monitoring area A to acquire the two-dimensional image G2 of the monitoring area A, and a three-dimensional camera 5 for acquiring the three-dimensional image G1 of the monitoring area A. A relative position of the two-dimensional camera 4 and the three-dimensional camera 5 is set in advance. Each pixel position in the two-dimensional image G2 acquired by the two-dimensional camera 4 and each pixel position in the three-dimensional image G1 acquired by the three-dimensional camera 5 are associated with each other accurately. The two-dimensional camera 4 and the three-dimensional camera 5 may be integrated instead of separating them.

The three-dimensional camera 5 is disposed vertically downward above the monitoring area A, for example. In the example illustrated in FIG. 1, the two-dimensional camera 4 is disposed to be slightly angled against the three-dimensional camera 5 such that the monitoring area A that is the same as the monitoring area A of the three-dimensional camera 5 is arranged within the view to thereby acquire the two-dimensional image G2 containing a planar view of the monitoring area A. Meanwhile, the three-dimensional camera 5 is configured to acquire the three-dimensional image G1 showing distribution of heights of the respective parts in the monitoring area A.

The image processing unit 3 includes an object extraction unit 6 that extracts an object B in the monitoring area A from the three-dimensional image G1 acquired by the three-dimensional camera 5, a search area setting unit 7 that sets a search area C1 including the object B extracted by the object extraction unit 6, an image correspondence calculation unit 8 that converts the search area C1 set by the search area setting unit 7 into a search area C2 of the two-dimensional image G2 acquired by the two-dimensional camera 4, an image searching unit 9 that searches the search area C2 of the two-dimensional image G2 for an image identical to a reference image M, and a determination unit 100 that determines the type of the object B depending on whether or not an image identical to the reference image M is found in the search area C2.

Figure 2:
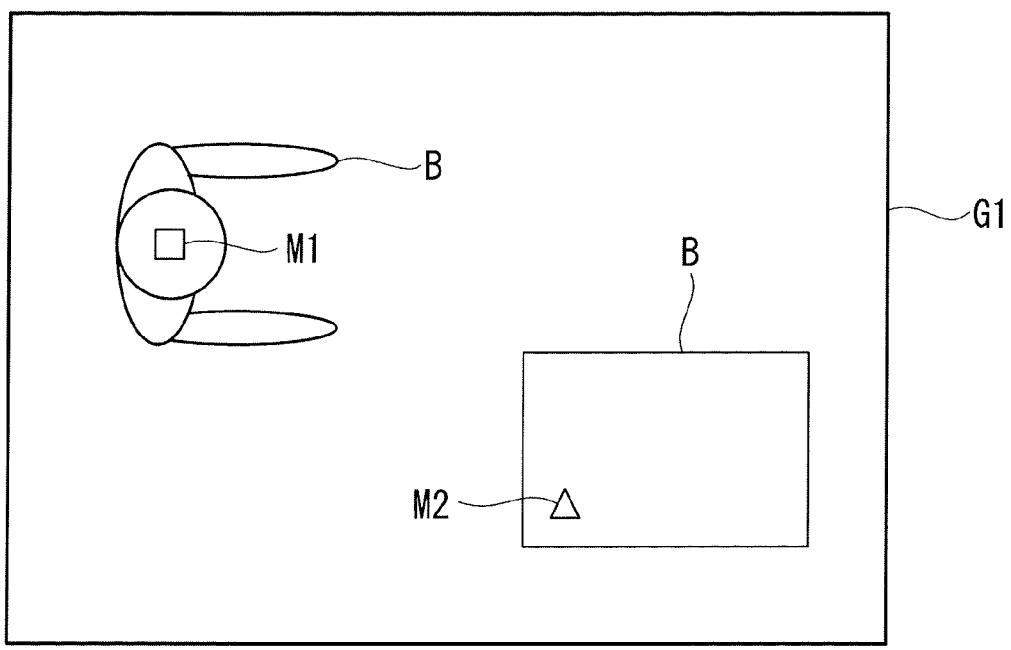
FIG. 2 is a diagram illustrating an exemplary three-dimensional image acquired by the object recognition device of FIG. 1.

In the present embodiment, as the objects B, a head, that is, a human with a helmet on which a square mark M1 is put, for example, and a workbench having a top plate on which a triangle mark M2 is put, are exemplarily shown as illustrated in FIG. 2.

Figure 3:
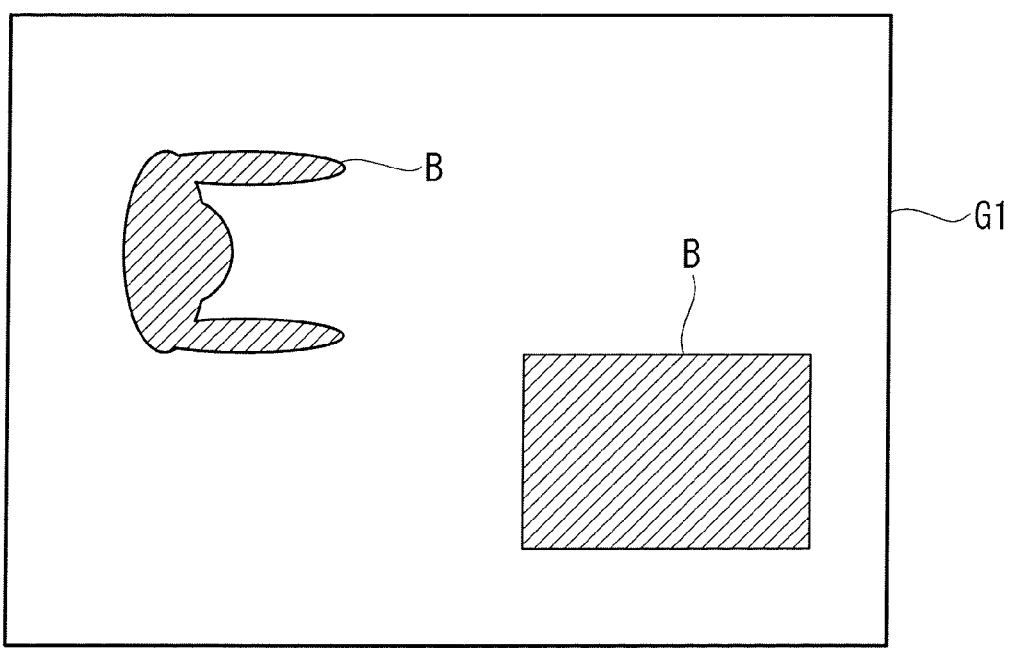
FIG. 3 is a diagram illustrating an exemplary two-dimensional image of an object extracted from the three-dimensional image of FIG. 2.

Regarding extraction of the object B, the object extraction unit 6 is configured to extract pixels disposed in a predetermined height range in the monitoring area A of the three-dimensional image G1 as an area where the object B is to exist. Specifically, as illustrated in FIG. 3, pixel values of the three-dimensional image G1 are binarized with a predetermined value, whereby an area having a predetermined height or higher from the ground is extracted as the object B. Then, the object extraction unit 6 extracts an area in which pixels extracted through binarization continuously exist, as an area representing a single objet B.

Figure 4:
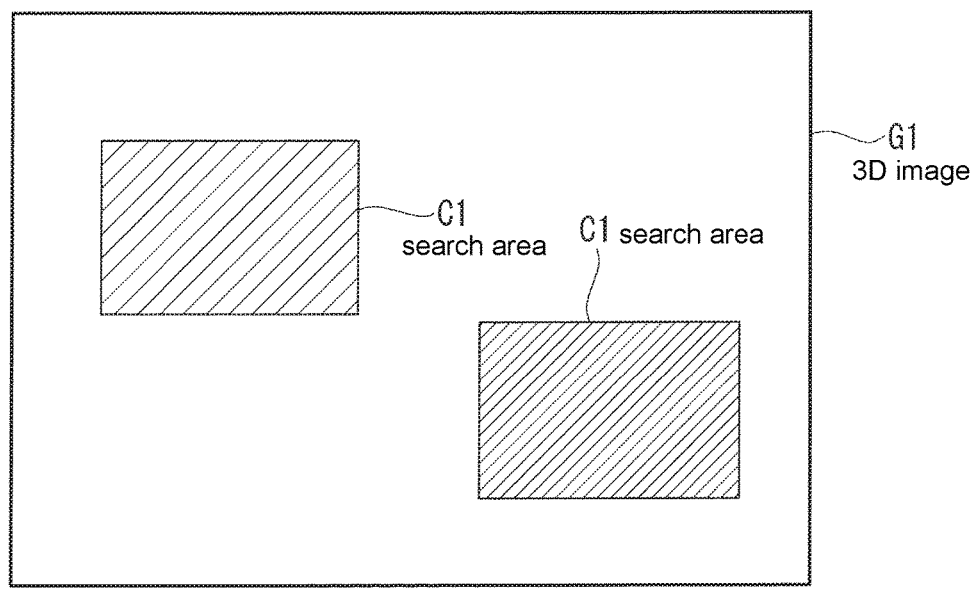
FIG. 4 is a diagram illustrating an exemplary search area including the object extracted in FIG. 3.

The search area setting unit 7 is configured to replace the area representing the object B extracted by the object extraction unit 6 with an area of a simple shape containing the extracted area, that is, an area of a rectangular shape (hereinafter referred to as a search area) C1, for example, as illustrated in FIG. 4.

Figure 5:
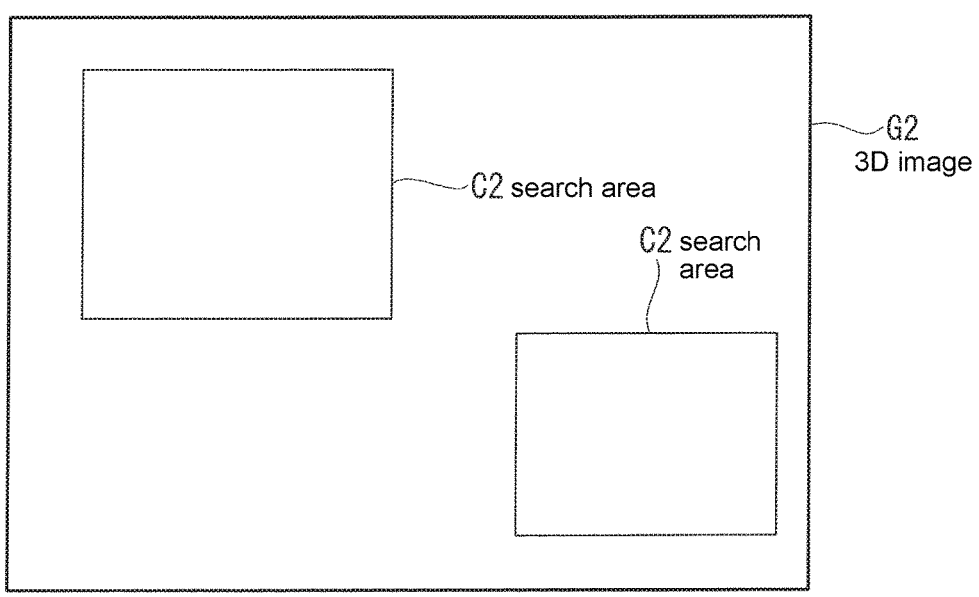
FIG. 5 is a diagram illustrating an exemplary search area in a two-dimensional image corresponding to the search area set in FIG. 4.

The image correspondence calculation unit 8 stores data representing a correspondence positional relation between the two-dimensional image G2 and the three-dimensional image G1. The image correspondence calculation unit 8 is configured to convert the search area C1 in the three-dimensional image G1 set by the search area setting unit 7 as illustrated in FIG. 4 into a search area C2 in the two-dimensional image G2 as illustrated in FIG. 5, and transmit it to the image searching unit 9.

The image searching unit 9 stores reference images to be searched, that is, reference images M of the shapes identical to the square mark M1 put on the human and the triangle mark M2 put on the workbench, respectively. This means that a square reference image M is stored in association with a human and a triangular reference image M is stored in association with a workbench.

The image searching unit 9 is configured to search the search area C2 of the two-dimensional image G2 transmitted from the image correspondence calculation unit 8, for an image identical to each reference image M, through image processing such as well-known pattern matching.

Then, when an image identical to the reference image M is found in the search area C2 of the two-dimensional image G2, the determination unit 100 recognizes that the type of the object B is the type associated with the reference image M. Meanwhile, when such an image is not found, the determination unit 100 recognizes that the type of the object B is a foreign object.

An object recognition method using the object recognition device 1 according to the present embodiment, configured as described above, will be described below.

Figure 6:
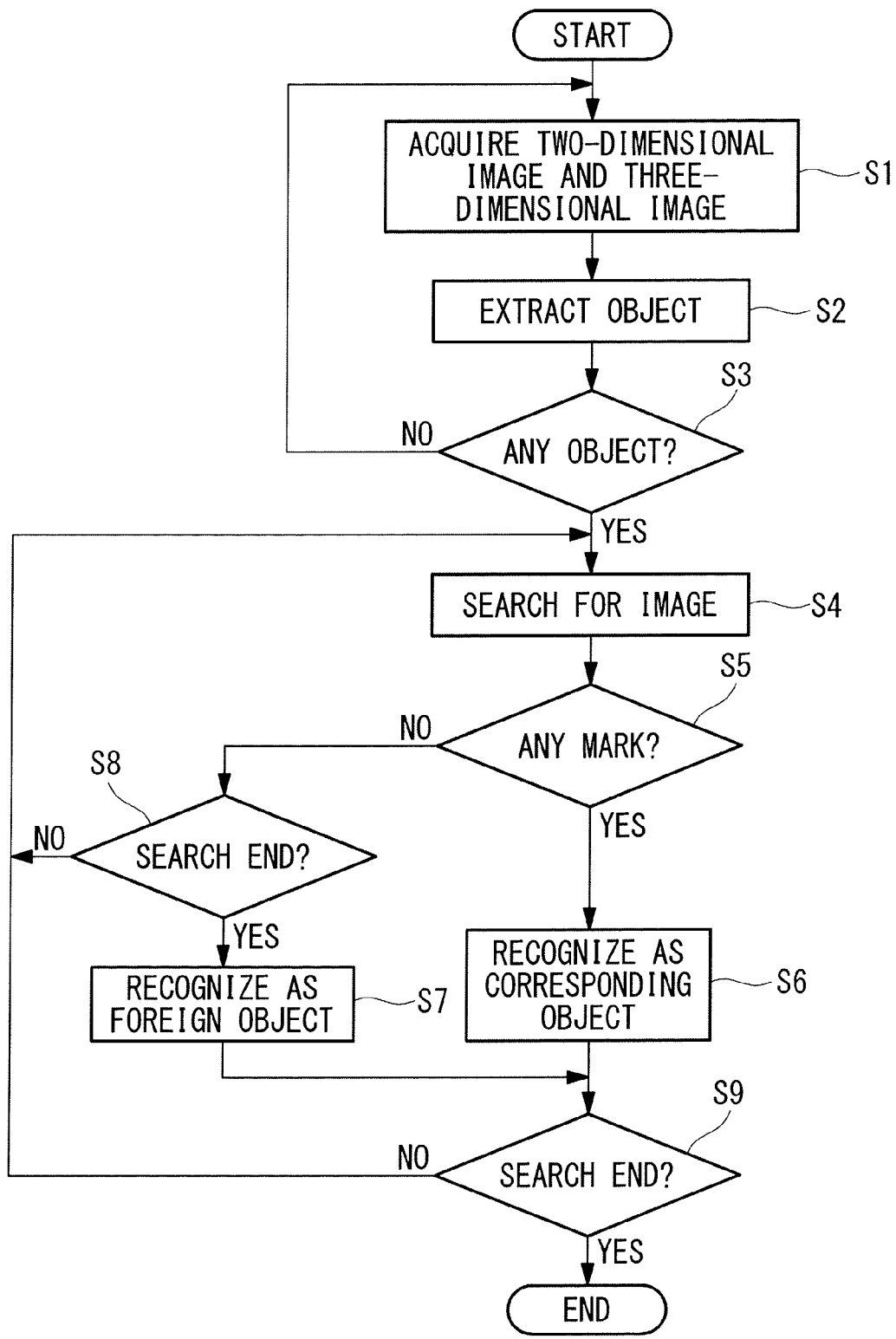
FIG. 6 is a flowchart explaining an object recognition method using the object recognition device of FIG. 1.

As illustrated in FIG. 6, the object recognition method according to the present embodiment includes an imaging step S1 in which the two-dimensional image G2 and the three-dimensional image G1 of the monitoring area A are acquired by the imaging unit 2, an object extraction step S2 in which an area where the object B exists is extracted from the three-dimensional image G1, a step S3 of determining whether or not the object B is extracted, an image searching step S4 in which, when the object B is extracted, the two-dimensional image G2 is searched for a mark identical to the stored reference image M, a step S5 of determining whether or not the mark identical to the reference image M is found in the search area C2, and determination steps S6 and S7 in which the type of the object B is determined depending on whether or not the mark is found.

At step S3, when it is determined that the object B is not extracted, the procedure from step S1 is repeated.

At step S5, when the mark is not found, it is determined whether or not the search has ended (step S8), and when it has ended, it is recognized that the object B is a foreign object in the determination step S7. When the search has not ended, the procedure from step S4 is repeated.

At step S5, when it is determined that the mark is found in the search area C2, at determination step S6, it is recognized that the object B is an object corresponding to the reference image M, and it is determined whether or not the search has ended (step S9). When it has not ended, the procedure from step S4 is repeated.

In this way, according to the object recognition device 1 and the object recognition method of the present embodiment, presence or absence of the object B is recognized by using the three-dimensional image G1, and the type of the object B is recognized by using the two-dimensional image G2. Accordingly, even in the case of the object B having a variable shape such as a human or a robot, there is an advantage that the type of the object B can be recognized more reliably.

Further, in the present embodiment, by putting a mark M1 on every human, when the mark M1 is detected in the search areas C1 and C2, it can be recognized that the object B is a human. Meanwhile, by putting the mark M1 only on a particular human, there is also an advantage that it can be recognized that the object B is the particular human.

Further, in the present embodiment, in the three-dimensional image G1 acquired by the three-dimensional camera 5, continuous areas having height information of a predetermined range are extracted as single object B. Accordingly, not only a human but also an article held by the human can also be recognized as part of the object B.

Further, as search areas C1 and C2 containing the object B extracted from the three-dimensional image G1, areas having a simple shape such as a rectangle are defined. Accordingly, it is possible to easily determine whether or not the reference image M exists in the search area C2.

Further, in the present embodiment, the image searching unit 9 may adjust the scale of the reference image M based on the height information (distance information from the three-dimensional camera 5) of each part in the three-dimensional image G1 acquired by the three-dimensional camera 5. In the two-dimensional image G2, the size of the mark M1 or M2 put on the object B varies according to the height of the object B. Therefore, when the mark M1 or M2 is put on at a high position, the size of the reference image M is adjusted to be larger, while when the mark M1 or M2 is put on at a low position, the size of the reference image M is adjusted to be smaller. Thereby, it is possible to easily search for an image identical to the reference image M in the two-dimensional image G2.

Figure 7:
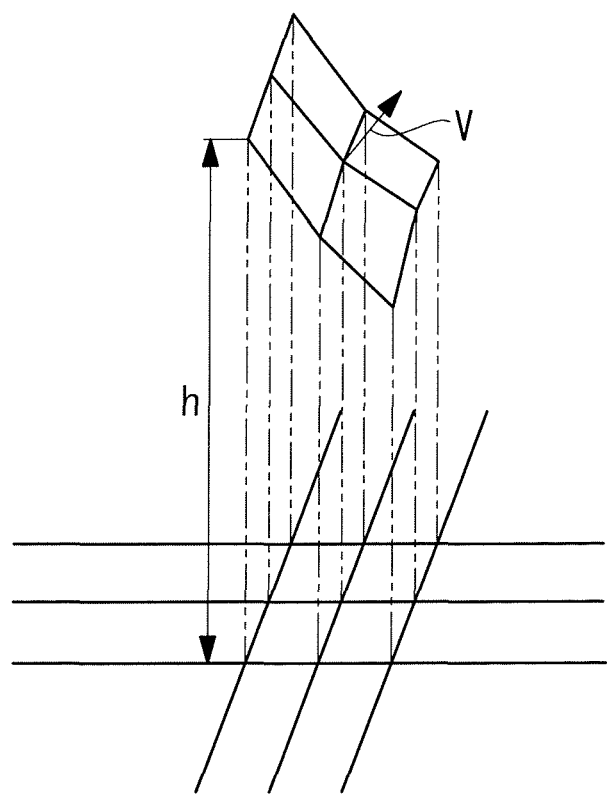
FIG. 7 is a diagram illustrating an exemplary three-dimensional inclination in a three-dimensional image acquired by the object recognition device of FIG. 1.

Further, when the mark M1 or M2 put on the object B is on a surface inclined against the optical axis of the three-dimensional camera 5 based on the height information of each part in the three-dimensional image G1 acquired by the three-dimensional camera 5, the image searching unit 9 may perform searching by deforming the reference image M based on the inclination angle relative to the optical axis of the three-dimensional camera 5. This means that as illustrated in FIG. 7, a normal vector V of each part can be obtained based on the height information h of each part in the three-dimensional image G1, and the rectangular reference image M may be deformed into a trapezoidal shape according to the direction of the obtained normal vector V.

Figure 8:
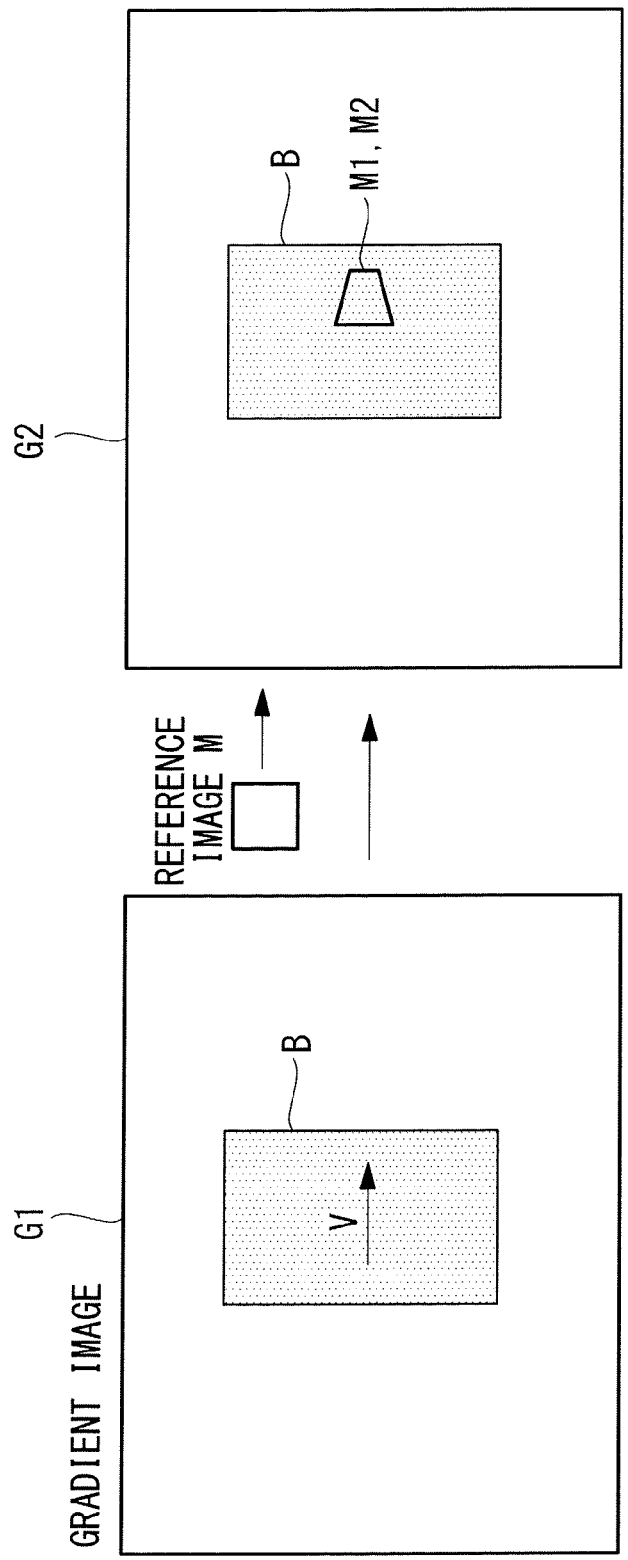
FIG. 8 is a diagram illustrating an exemplary two-dimensional image of an object extracted from the three-dimensional image of FIG. 7.

As illustrated in FIG. 8, the mark M1 or M2 captured in the two-dimensional image G2 is in a trapezoidal shape gradually reduced in size in a height decreasing direction. As such, there is an advantage that the position of the mark M1 or M2 can be easily searched by using the trapezoidal reference image M.

Next, a robot system 70 using the object recognition device 1 and the object recognition method according to the present embodiment will be described.

Figure 9:
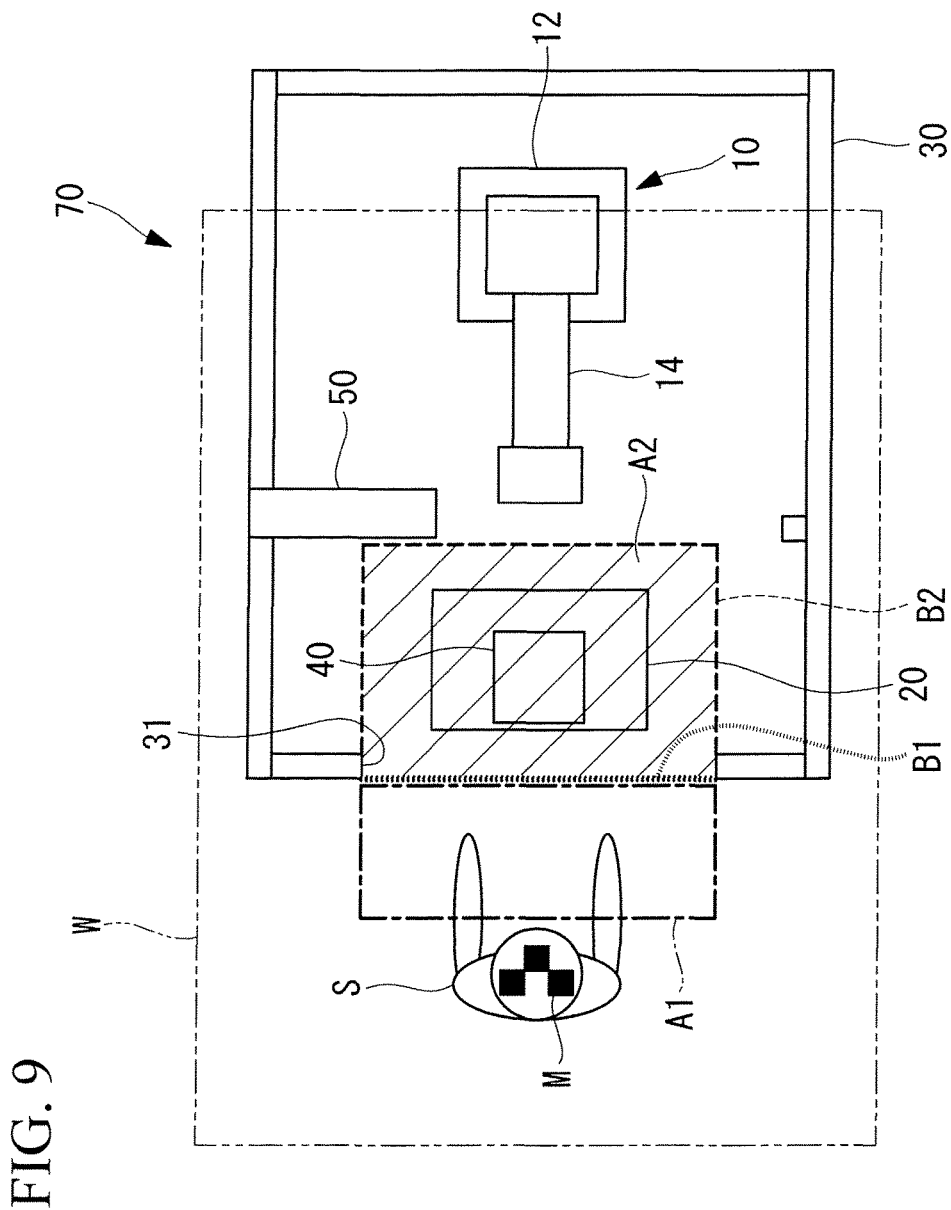
FIG. 9 is a plan view illustrating a robot system that is an exemplary application of the object recognition device of FIG. 1.
Figure 10:
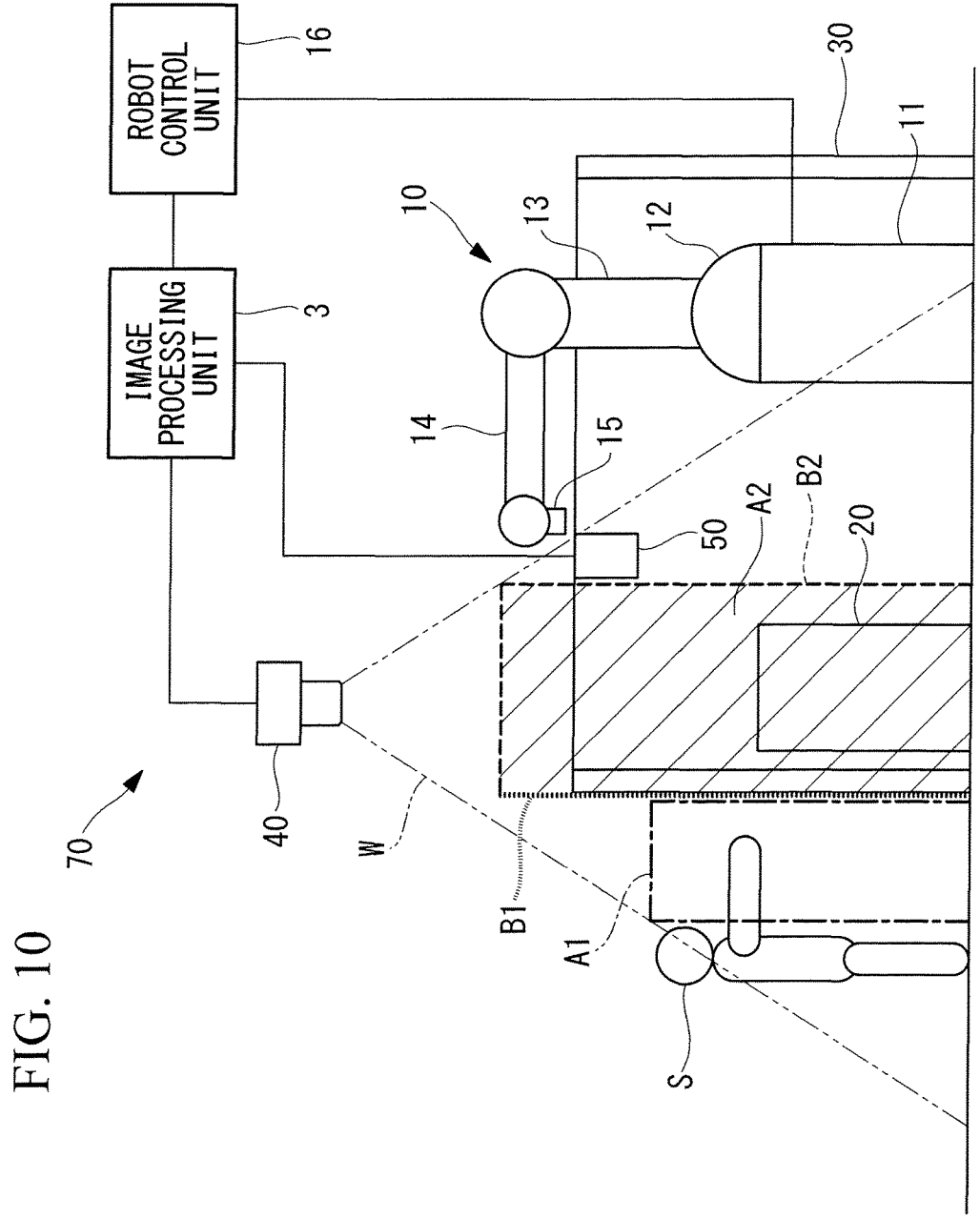
FIG. 10 is a front view of the robot system of FIG. 9.

As illustrated in FIGS. 9 and 10, the robot system 70 includes a robot 10 that performs a predetermined work, a workbench 20 on which the robot 10 performs the work, and a safety fence 30 surrounding the robot 10 and the workbench 20.

In the robot system 70, when a worker S exchanges or adjusts a jig, a mold, a work, or the like on the workbench 20, the worker S may place a hand or the head above the workbench 20. At a location opposite to the robot 10 over the workbench 20, a portion of the safety fence 30 has an opening 31 for the worker S to access the workbench 20.

The robot system 70 further includes an imaging unit 40 provided above the workbench 20, and a display device 50 supported by the safety fence 30. The imaging unit 40 acquires the two-dimensional image G2 and the three-dimensional image G1 at a predetermined frame rate at time intervals, with a view W shown by an alternate long and two short dashes line in FIGS. 9 and 10 such that at least a part of the work area of the robot 10 and at least a part of the area where the worker S can enter are captured. The display device 50 has a liquid crystal screen, and is disposed at a position seen from the worker S near the opening 31.

The robot 10 is a six-axis articulated type robot fixed on the floor, for example, and is configured to move a work (not illustrated) on the workbench 20, process a work, and the like. The robot 10 may be in any form.

The robot 10 is connected with a robot control unit 16, and is configured such that operation of each axis is controlled by the robot control unit 16.

In FIGS. 9 and 10, the imaging unit 40 is illustrated as single camera. However, similar to the case of FIG. 1, a stereo camera or a TOF (Time of Flight) type three-dimensional camera 5 and the two-dimensional camera 4 such as a CCD or a CMOS image sensor may be provided separately, for example.

The robot system 70 is configured to make the image processing unit 3 identify the object B based on the two-dimensional image G2 and the three-dimensional image G1 acquired by the imaging unit 40 and display the identification result on the display device 50, and make the robot control unit 16 control the robot 10. The imaging unit 40 and the image processing unit 3 constitute the object recognition device 1 of the present embodiment.

In the robot system 70, a worker recognition area A1 surrounded by an alternate long and short dash line and a common work area A2 indicated by hatching lines are set in the three-dimensional images G1 acquired in a time-series manner, as illustrated in FIGS. 9 and 10. The common work area A2 is an area accessible by the worker S and also accessible by the robot 10.

Further, in the robot system 70, in the three-dimensional images G1 acquired in a time-series manner, a worker side boundary B1 and a robot side boundary B2, illustrated in FIGS. 9 and 10, are set. The worker side boundary B1 is a boundary face that the worker S crosses when accessing the common work area A2. The robot side boundary B2 is a boundary face that the robot 10 crosses when accessing the common work area A2.

With use of the worker recognition area A1 and the common work area A2 as monitoring areas, the object B in the monitoring area is extracted from the three-dimensional images G1 acquired in a time-series manner to set the search area C1, and in the corresponding search area C2 in the two-dimensional images G2 acquired in a time-series manner simultaneously, it is determined whether or not a reference image, that is, a mark M as illustrated in FIG. 9, exists. When there is the mark M, the detected object B is recognized as the worker S that is a safety monitoring target. Meanwhile, when there is no mark M, the detected object B is recognized as a non-target object.

In the example illustrated in FIG. 9, the mark M is configured of three black-colored squares put on an upper face of a helmet or a cap of the worker S. The three colored squares are arranged to be aligned in the width direction (right and left direction) of the worker S, and the central colored square is arranged at the front side of the worker S relative to the other two squares. Thereby, it is possible to determine or infer the face direction of the worker S by monitoring the mark M.

According to the present embodiment, the worker S is recognized as a safety monitoring target in the two-dimensional images G2 and the three-dimensional images G1 acquired in a time-series manner, and the worker S is tracked in the two-dimensional images G2 and the three-dimensional images G1. Accordingly, it is possible to monitor the worker S without losing the worker S in the two-dimensional images G2 and the three-dimensional images G1. Thereby, it is possible to reliably detect that the worker S enters the boundary where he/she is not allowed to enter (robot side boundary B2). Then, upon detection of entry, it is possible to stop the robot 10 or cause the robot 10 to perform danger avoiding operation.

In the three-dimensional image G1, the worker side boundary B1 that is crossed from the worker S side to access the common work area A2 and the robot side boundary B2 existing on the robot 10 side in the common work area A2 are set. When an object is recognized as a safety monitoring target, it can cross the worker side boundary B1 to access the common work area A2. However, regarding a non-target object not recognized as a safety monitoring target, entry to the worker side boundary B1 to access the common work area A2 over the worker side boundary B1 is detected. Accordingly, when a person who is not the worker S and not having enough knowledge of safety work (who is not marked with the mark M) moves toward the common work area A2, for example, the movement is detected at the point when he/she enters the worker side boundary B1. Therefore, by stopping the robot 10 or causing the robot 10 to perform danger avoiding operation, for example, a person not having enough knowledge of safety work is prevented from being brought into contact with the robot 10.

Further, as the robot 10 is a non-target object, when an abnormality that the robot 10 passes through the common work area A2 and crosses the worker side boundary B1 occurs, the abnormality can be detected. Furthermore, in an abnormal case where a jig or a work in the common work area A2 is moved to the worker S side unintentionally, or in an abnormal case where a jig or a work held by the worker S is separated from the hand of the worker S and enters into the common work area A2, such an abnormality can be detected.

With a configuration in which an attempt is made to match the mark M in the vicinity of a location where the mark M has been recognized in the previous frame when tracking the worker S in the three-dimensional images G1, it is possible to reduce the processing time and to reduce the possibility of erroneous detection.

It should be noted that more than one workers S may be recognized as safety monitoring targets. In that case, the same processing as described above is performed on each of the workers S. This means that the safety monitoring processing as described above is performed until all workers S are not recognized any more.

In the present embodiment, when entry by a non-target object is detected, the robot 10 is stopped. Accordingly, it is possible to secure safety of the worker S and to prevent failure of the robot 10.

Further, not only the worker S but also an article carried by the worker S is also a safety monitoring target. Accordingly, it is possible to prevent contact between the article and the robot 10 and the like, whereby safety of the worker S and failure prevention of the robot 10 can be secured.

Further, even when entry of a non-target object is detected, the robot 10 may continue work outside the common work area A2. In that case, safety of the worker S can be secured without deteriorating the operation rate of the robot 10.

Further, in the present embodiment, the worker S is able to check whether or not he/she is recognized as a safety monitoring target by watching the display device 50. Thereby, it is possible to prevent the worker S from performing work in the common work area A2 even though he/she is not recognized as a safety monitoring target, or to prevent generation of a waiting time due to the fact that the worker S does not know whether or not he/she is recognized as a safety monitoring target so that he/she must wait.

Further, the reference image M may be associated with information relating to the height and the body type of the worker S. The three-dimensional image G1 includes information regarding the height of the head or the shoulder of the worker S in the three-dimensional image G1. Accordingly, by associating the reference image M with the information regarding the height of the head or the shoulder of the worker S allowed to work, it is possible to determine whether or not a person having the mark M on the helmet is the worker S allowed to work.

In that case, when it is determined that a person has the mark M on the helmet but is not a person allowed to work, such a person is recognized as a non-target object. When such a person enters the worker side boundary B1, the robot 10 will be stopped.

Further, it is also acceptable to put a robot mark on the robot 10, and store another reference image for recognizing the robot 10 by searching the two-dimensional image G2 for the robot mark put on the robot 10. In that case, it can also be configured to recognize the robot 10 as a safety monitoring target like the worker S, and detect that an object other than the safety monitoring target enters the robot side boundary B2.

Thereby, the position of the robot 10 can also be tracked. Therefore, in the case where the robot 10 crosses the worker side boundary B1 that the worker S is allowed to cross but the robot 10 is not allowed to cross in the common work area A2, or in the case where the robot 10 moves in a manner different from that in a normal state, such a phenomenon can be known immediately. This is effective in improving the safety.

It should be noted that in the present embodiment, the worker recognition area A1, the common work area A2, the worker side boundary B1, and the robot side boundary B2 are set in the three-dimensional image G1. Instead, it is also possible to set the worker recognition area A1, the common work area A2, the worker side boundary B1, and the robot side boundary B2 on the floor using tapes or the like, and these areas and boundaries captured in the two-dimensional image G2 can be used as the worker recognition area A1, the common work area A2, the worker side boundary B1, and the robot side boundary B2. In that case, when the object B detected in the three-dimensional image G1 overlaps the worker side boundary B1 or the robot side boundary B2, the object B may be determined to enter the boundary.

The inventors have arrived at the following aspects of the present invention.

An aspect of the present invention provides an object recognition device including an imaging unit that captures images of a predetermined monitoring area to acquire a three-dimensional image and a two-dimensional image; an object extraction unit that extracts an area having pixels whose pixel values are within a predetermined range from the three-dimensional image acquired by the imaging unit; an image searching unit that searches the two-dimensional image, acquired by the imaging unit, for a reference image registered in advance according to a type of an object; and a determination unit that determines the type of the object depending on whether or not the reference image searched for by the image searching unit exists in the area extracted by the object extraction unit.

According to the present aspect, when images of a predetermined monitoring area is captured and a two-dimensional image and a three-dimensional image are acquired by the imaging unit, an area having pixels whose pixel values are within a predetermined range is extracted by the object extraction unit from the acquired three-dimensional image, a reference image is searched for by the image searching unit from the acquired two-dimensional image, and the type of an object is determined depending on whether or not the reference image exists in the extracted area by the determination unit. The type of the object in the monitoring area is recognized not by the shape of the object in the three-dimensional image but according to the fact that a reference image registered in advance exists at a position of the extracted object in the three-dimensional image. Accordingly, it is possible to recognize an object whose shape varies such as a human or a robot with high accuracy.

According to the aforementioned aspect, the object recognition device may also include a search area setting unit that sets a search area to be searched by the image searching unit so as to contain the area extracted by the object extraction unit.

With this configuration, the shape of the area representing the object extracted by the object extraction unit is not used directly. Rather, a search area that is simplified to contain the area can be set. Thereby, searching operation by the image searching unit can be performed easily.

Further, in the aforementioned aspect, the image searching unit may perform the search while changing the scale of the reference image based on a distance, from the imaging unit, of each part in the three-dimensional image acquired by the imaging unit.

A mark put on an object disposed at a position having a closer distance from the imaging unit is captured to be larger in the two-dimensional image, while a mark put on an object disposed at a position having a farther distance from the imaging unit is captured to be smaller in the two-dimensional image. With this configuration, by changing the scale of the reference image according to the distance from the imaging unit, the size of the reference image can be made closer to that of the mark to be searched. Thereby, the search can be performed easily.

Further, in the aforementioned aspect, the image searching unit may perform the search while deforming the reference image based on an inclination angle, relative to an optical axis of the imaging unit, of each part in the three-dimensional image acquired by the imaging unit.

When the surface of an object with a mark is at an inclined position relative to the optical axis of the imaging unit, the mark is deformed. With this configuration, by deforming the reference image according to the inclination angle of the surface of the object, the shape of the reference image can be made closer to that of the mark to be searched. Thereby, the search can be performed easily.

Further, another aspect of the present invention provides an object recognition method including an imaging step of capturing images of a predetermined monitoring area to acquire a three-dimensional image and a two-dimensional image; an object extraction step of extracting an area having pixels whose pixel values are within a predetermined range from the three-dimensional image acquired by the imaging step; an image searching step of searching the two-dimensional image, acquired by the imaging step, for a reference image registered in advance according to a type of an object; and a determination step of determining the type of the object depending on whether or not the reference image searched for by the image searching step exists in the area extracted by the object extraction step.

The aforementioned aspects can achieve an advantageous effect that an object whose shape varies such as a human or a robot can be recognized with high accuracy.

REFERENCE SIGNS LIST 1 object recognition device
2 imaging unit
6 object extraction unit
7 search area setting unit
9 image searching unit
100 determination unit
A monitoring area
A1 worker recognition area (monitoring area)
A2 common work area (monitoring area)
B object
C1, C2 search area
M reference image
G1 three-dimensional image
G2 two-dimensional image
S1 imaging step
S2 object extraction step
S4 image searching step
S5 determination step

The invention claimed is:

1. An object recognition device comprising:
  an imaging unit that captures images of a predetermined monitoring area to acquire a three-dimensional image and a two-dimensional image; and
  a controller which has positional-relation-correspondence information between pixels of the three dimensional image and pixels of the two dimensional image, wherein the controller is configured to conduct:
    an object extraction process that extracts, in the three dimensional image whose pixels respectively have their height information, an area having pixels whose pixel values are within a predetermined height range, and that determines a search area in the two-dimensional image so as to correspond to the extracted area based on the positional-relation-correspondence information;
    an image searching process that searches the two-dimensional image, acquired by the imaging unit, for a reference image registered in advance according to a type of an object; and
    a determination process that determines the type of the object depending on whether or not the reference image searched for in the image searching process exists in the search area determined in the two dimensional image; and
    a control unit that controls a robot based on the determination process.

2. The object recognition device according to claim 1, wherein the controller is configured to further conduct
  a search area setting process that sets a search area to be searched in the image searching process so as to contain the area extracted in the object extraction process.

3. The object recognition device according to claim 1, wherein
  in the image searching process, the controller is configured to perform the search while changing scale of the reference image based on a distance, from the imaging unit, of each part in the three-dimensional image acquired by the imaging unit.

4. The object recognition device according to claim 1, wherein
  in the image searching process, the controller is configured to perform the search while deforming the reference image based on an inclination angle, relative to an optical axis of the imaging unit, of each part in the three-dimensional image acquired by the imaging unit.

5. An object recognition method comprising:
  an imaging step of capturing images of a predetermined monitoring area to acquire a three-dimensional image and a two-dimensional image;
  an object extraction step of extracting, in the three dimensional image whose pixels respectively have their height information, an area having pixels whose pixel values are within a predetermined height range and that determines a search area in the two-dimensional image so as to correspond to the extracted area based on positional-relation-correspondence information;
  an image searching step of searching the two-dimensional image, acquired by the imaging step, for a reference image registered in advance according to a type of an object; and
  a determination step of determining the type of the object depending on whether or not the reference image searched for by the image searching step exists in the search area determined in the two dimensional image; and
  a control step of controlling a robot based on the determination process.

6. An object recognition device comprising:
  an imaging unit that captures images of a predetermined monitoring area to acquire a three-dimensional image and a two-dimensional image; and
  a controller which has positional-relation-correspondence information between pixels of the three dimensional image and pixels of the two dimensional image, wherein the controller is configured to conduct:

an object extraction process that binarizes and extracts, in the three dimensional image whose pixels respectively have their height information, an area having pixels whose pixel values are within a predetermined height range, and that determines a search area in the two-dimensional image so as to correspond to the extracted area based on the positional-relation-correspondence information;

an image searching process that searches the two-dimensional image, acquired by the imaging unit, for a reference image registered in advance according to a type of an object; and a determination process that determines the type of the object depending on whether or not the reference image searched for in the image searching process exists in the search area determined in the two dimensional image; and a control unit that controls a robot based on the determination process.

* * * * *